United States Patent [19]

Imai

[11] 4,352,526
[45] Oct. 5, 1982

[54] SLIDE ROLLER BEARING

[75] Inventor: Katsuhito Imai, Nagoya, Japan

[73] Assignee: Hiroshi Teramachi, Tokyo, Japan

[21] Appl. No.: 224,661

[22] Filed: Jan. 13, 1981

[30] Foreign Application Priority Data

Jan. 23, 1980 [JP] Japan .................................. 55-6359

[51] Int. Cl.³ .............................................. F16C 29/06
[52] U.S. Cl. .................................... 308/6 C; 308/6 R
[58] Field of Search .............. 308/6 C, 6 R, 6 B, 6 A, 308/3.8, 7, 3 R

[56] References Cited

U.S. PATENT DOCUMENTS

| 3,003,828 | 10/1961 | Stark | 308/6 C |
| 3,567,295 | 3/1971 | Wilkes | 308/6 C |
| 3,915,513 | 10/1975 | Mayer | 308/6 C |

Primary Examiner—Lenard A. Footland
Attorney, Agent, or Firm—George B. Oujevolk

[57] ABSTRACT

There is disclosed a slide roller bearing including a race body, circulating rollers, spacers and upper and lower casing covers. The precision-machined track body defines on its circumference an endless circulating track which is provided with at least a pair of longitudinal channels and a center bank on the load-carrying side thereof and which is formed by a flat surface on the non-load-carrying side thereof. The spacers which retain the rollers in aligned state along the circulating track are each formed by a center supported body and a pair of spacing strips integrally formed at opposite lateral sides of the center body. The center body is provided with front and rear projections with upright sliding faces perpendicular to the axis of the rollers. The spacing strips are smaller than the rollers in length and have a thickness smaller than the diameter of the rollers. Each spacing strip has on its front and rear sides concave cylindrical faces of a radius of curvature substantially same as that of the circumferential surface of the rollers. The upper cover is provided with a pair of openings on opposite sides of a center retainer band and inwardly embossed guide portions substantially of U-shape in section in center portions contiguous to the non-load-carrying side of the circulating track, while the lower cover is provided with an inwardly embossed guide portion substantially of U-shape in section longitudinally along a center portion facing the non-load-carrying side of the circulating track.

3 Claims, 16 Drawing Figures

FIG. 4(a)
FIG. 4(b)
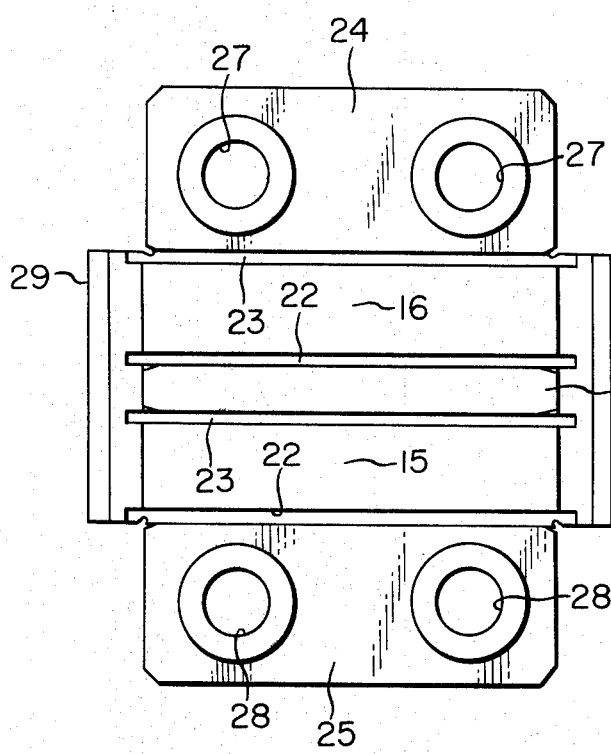
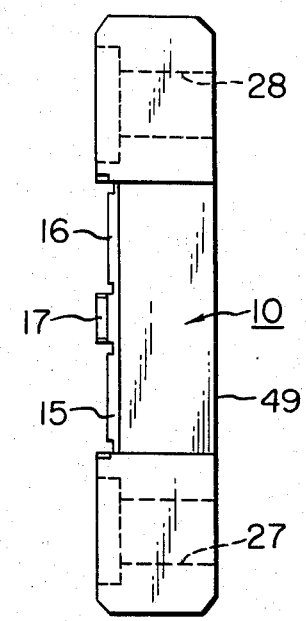
FIG. 4(c)
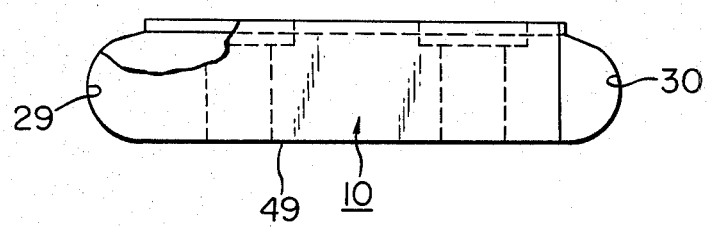

FIG. 5(a)
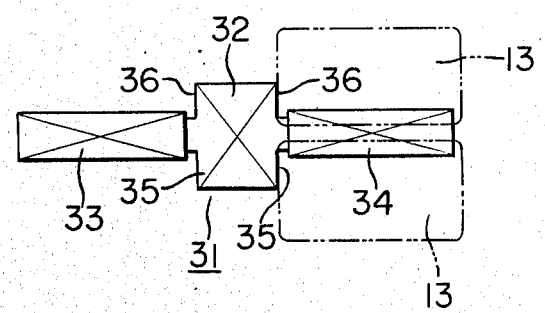
FIG. 5(b)     FIG. 5(c)
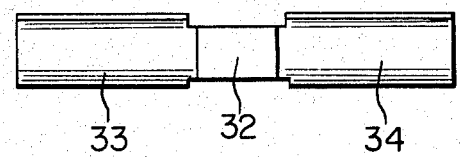 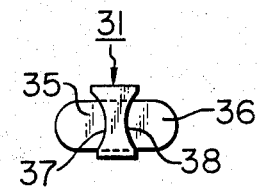
FIG. 5(d)
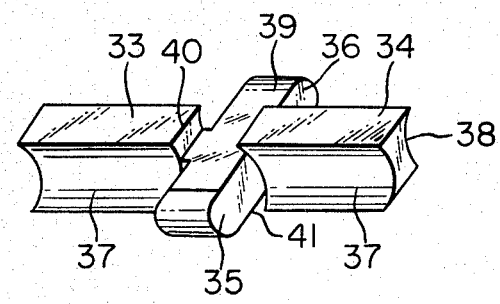

SLIDE ROLLER BEARING

BACKGROUND OF THE INVENTION

This invention concerns improvements in slide roller bearings.

The slide roller bearings of the type in which two rows of rollers are circulated together with spacers along an endless track around the circumference of a precision-machined race body ensure light and smooth movements even in preloaded state without involving friction of sliding parts and are thus suitable for application to machines which require high positioning accuracy, repeating accuracy and regidity. For these characteristics, they are used for machining centers, X-, Y- and Z-guides for various NC machine tools, electric discharge machining structures, high speed presses, precision press ram guides, press die exchangers and various types of carriages for the transfer of loads.

BRIEF REVIEW OF THE PRIOR ART

The conventional slide roller bearings which are arranged to guide the opposite ends of the rollers have to bear the lateral loads (thrust loads) on the faces of the roller ends of truncated cone shape so that they are susceptible to skewing which adversely affects the accuracy and causes damages to the side plates, shortening the service life of the bearings. In addition, the conventional roller bearings employ barbell-shaped rollers with a center portion of a reduced diameter (U.S. Pat. No. 3,003,828) in a guide ring (retainer) and a roller guide cover which are machined separately in the fabrication process, often resulting in inadequate guide of the rollers due to machining errors of the above-mentioned component parts or in a low productivity or high production cost owing to the great number of steps involved in the fabrication process.

In order to overcome these drawbacks, there has been developed a slide roller bearing (Japanese Pat. No. 781,139) which has a cover and a guide ring integrally formed from a steel sheet by a press. However, a slide roller bearing of this type has been found to have a defect in that the barbell-shaped rollers in contact with each other during the rolling motion, increasing the rolling friction by the synergistic effect resulting from the simultaneous sliding contact with the roller guide portions of the upper and lower covers.

In the circulating type bearing intended for linear motions, it is generally known to provide a separator of synthetic resin material between the individual rollers to prevent the rolling friction and skewing of the respective rollers.

However, the known separators are suitable for a slide roller bearing with a flat race body and cylindrical rollers but not for a circulating bearing with barbell-shape rollers and a track body having a longitudinal partition wall along the center of its circumference, since the separators are rocked on the partition wall to hinder smooth rolling movements of the rollers.

OBJECTS OF THE INVENTION

It is an object of the present invention to provide a slide roller bearing which overcomes the above-mentioned drawbacks or difficulties of the conventional counterparts.

It is a more particular object of the present invention to provide a slide roller bearing employing spacers which prevent skewing of rollers (declining of rollers), reduce rolling resistance, preclude dislocation of rollers and are capable of guiding rollers without contacting upper and lower covers which encase the bearing, in which each spacer consists of a center supported body and a pair of spacing wings or strips integrally formed at opposite lateral sides of the center body. The center body is provided with front and rear projections with upright sliding faces extending perpendicular to the axes of the circulating rollers. Each spacing strip is smaller than the rollers in length and has a thickness smaller than the diameter of the rollers, and provided on its front and rear sides with concave cylindrical faces of a radius of curvature substantially same as that of the cylindrical circumferential surfaces of the rollers.

It is another object of the present invention to provide a slide roller bearing in which upper and lower covers are centrally provided with inwardly embossed guide portions for appropriately guiding rollers to and from a load-carrying side of a circulating track on the circumference of the race body, in cooperation with a pair of longitudinal channels on the race body.

The above and other objects, features and advantages of the invention will become apparent from the following description and the appended claims, taken in conjunction with the accompanying drawings which show a preferred embodiment of the present invention.

BRIEF DESCRIPTION OF THE DRAWINGS

In the accompanying drawings

FIG. 4(a) shows a track body in plan view;
FIG. 4(b) is a front view of the track body shown in FIG. 4(a);
FIG. 4(c) is a side view of the track body shown in FIG. 4(a);
FIG. 5(a) illustrates a spacer in plan view, in which the roller is indicated by a double-dot chain line;
FIG. 5(b) shows a front view of FIG. 5(a);
FIG. 5(c) shows a side view of FIG. 5(a);
FIG. 5(d) shows a perspective view of FIG. 5(a)

DESCRIPTION OF PREFERRED EMBODIMENT

Figure 1:
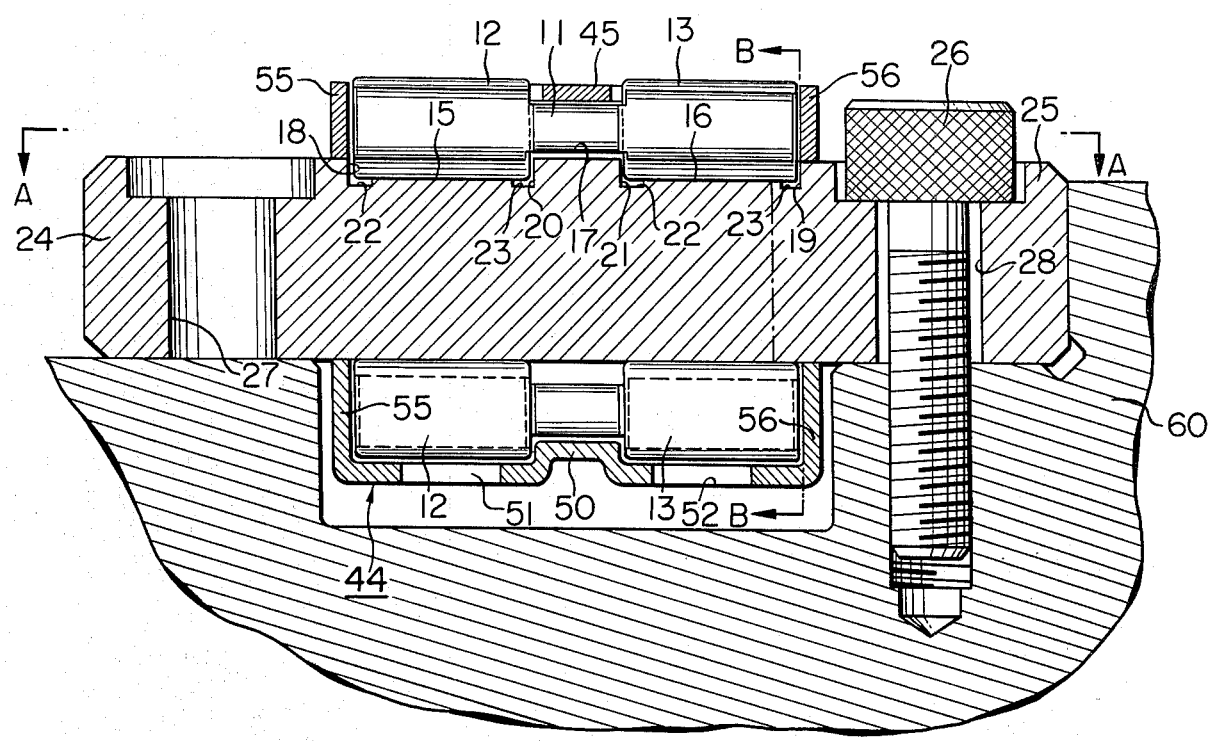
FIG. 1 is a longitudinal section of a slide roller bearing according to the present invention.
Figure 2:
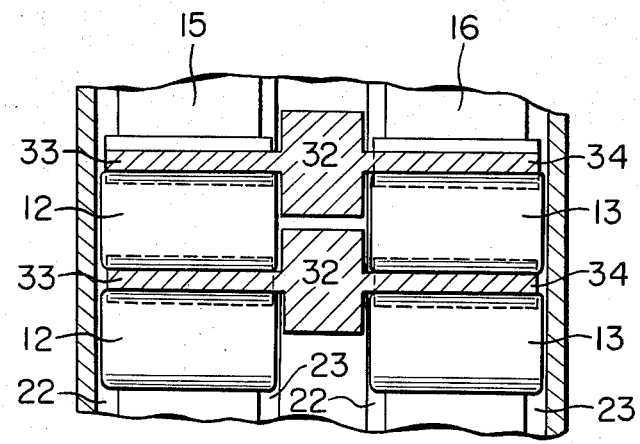
FIG. 2 is a section taken on line A-A of FIG. 1.
Figure 3:
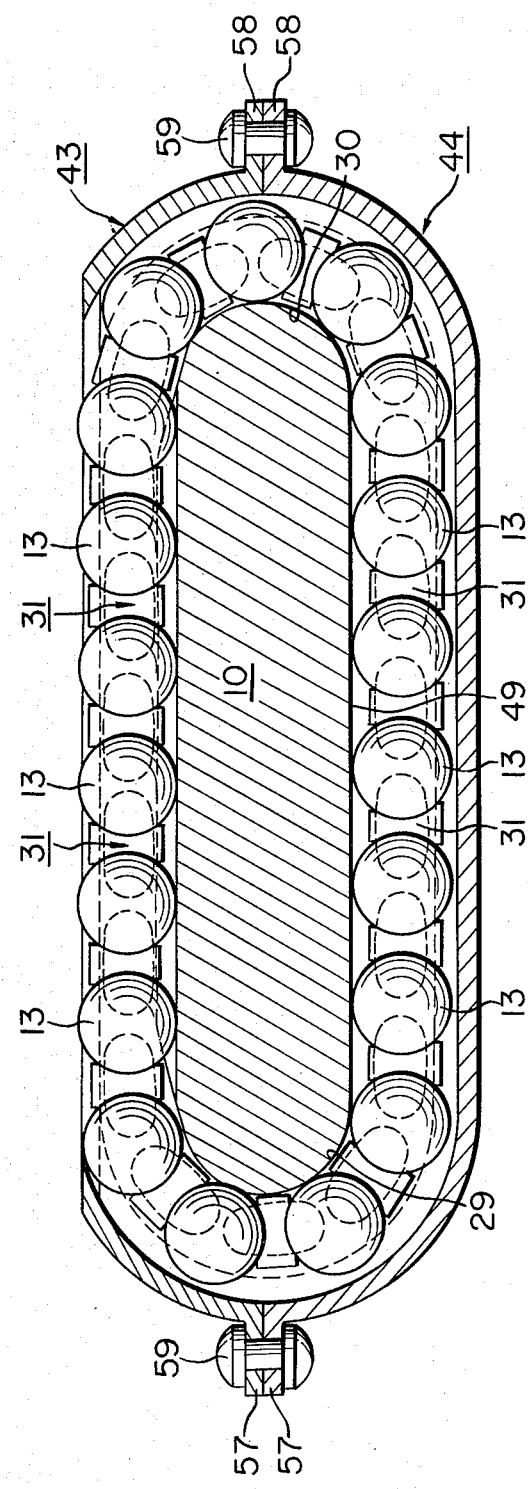
FIG. 3 is a section taken on line B-B of FIG. 1.
Figure 6A:
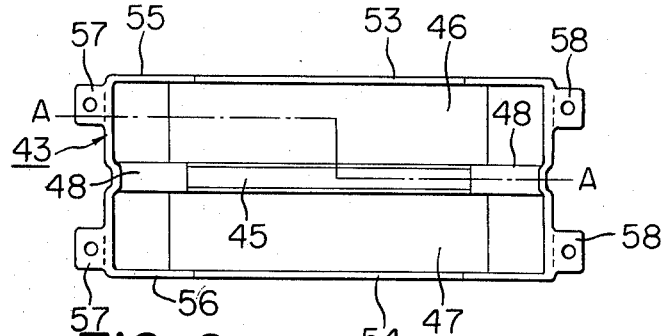
FIG. 6(a) shows an upper cover of the bearing in a plan view.
Figure 6B:
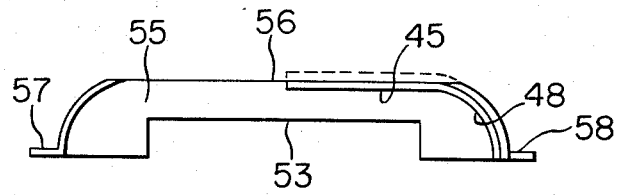
FIG. 6(b) shows a section of the upper cover taken on the line A-A, of FIG. 6(a)
Figure 6C:
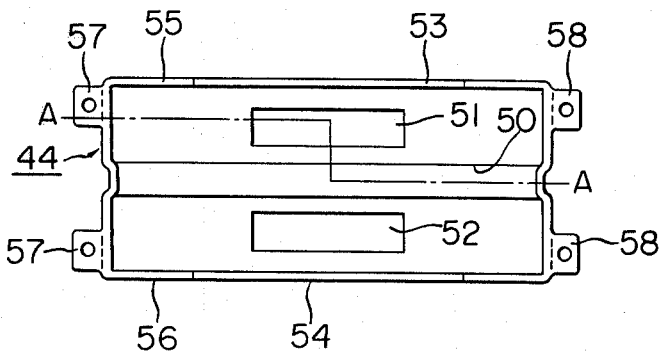
FIG. 6(c) shows a plan view of the lower cover.
Figure 6D:
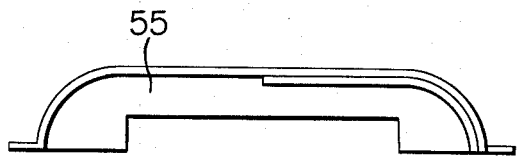
FIG. 6(d) shows a section of the lower cover taken on the line A-A of FIG. 6(c)
Figure 7:
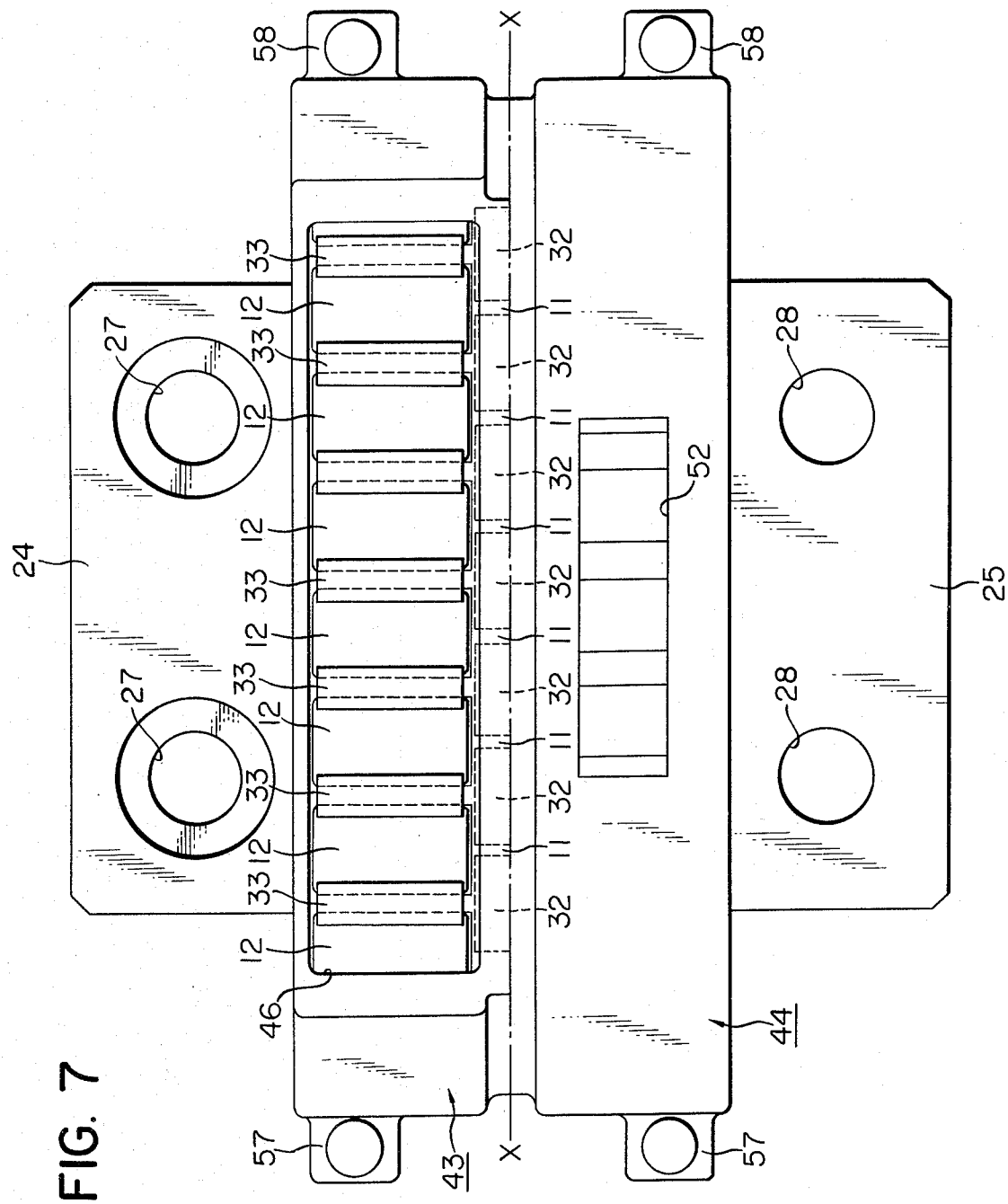
FIG. 7 illustrates in plan view the upper and lower sides of the bearing on the upper and lower sides of line X-X.
Figure 8:
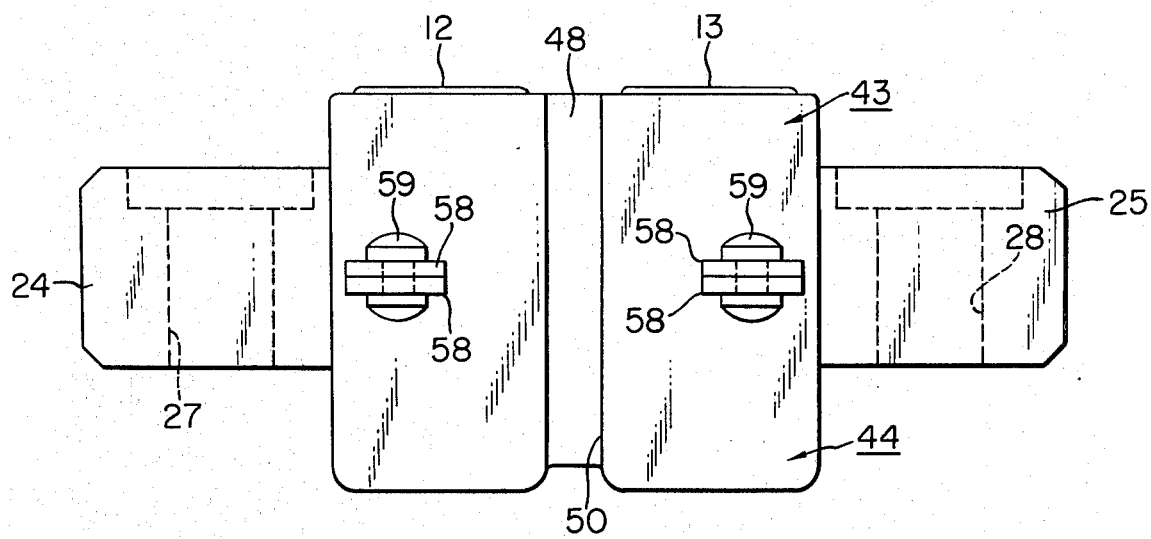
FIG. 8 is a side view of the bearing according to the invention.

Referring to the accompanying drawings which show a preferred embodiment of the invention, there is a race body 10 which defines an annular track surface around the circumference thereof. The race body 10 is provided with a pair of channels 15 and 16 of the same width as rollers 12 and 13 in the load-carrying side of the track surface, forming therebetween a center bank 17 of a width substantially the same as that of the center supported bodies of spacers. The channels 15 and 16 define side banks 18 and 19 and lateral walls 20 and 21 of the center bank 17.

Narrow escape grooves 22 and 23 are formed at opposite corners of the channels 15 and 16. Indicated at 29 and 30 are arcuate wall portions which guide the rollers 12 and 13 from the load-carrying to the non-load-carrying side of the track surface or vice versa. Integrally formed at opposite sides of the race body 10 are mounting portions 14 and 15 which are provided with a through hole 27 or 28 for insertion of mounting bolts 26.

A spaces 31 made of a synthetic resin material or a die cast or sintered alloy, has a center supported body 32 and opposite spacing strips 33 and 34. The center body 32 is provided with front and rear projections with sliding faces 35 and 36 perpendicular to the track surface for the circulation of the rollers 12 and 13.

The spacing strip 34 has a length slightly smaller than that of the rollers 12 and 13 and a thickness slightly smaller than the diameter of the rollers 12 and 13. On the front and rear sides, the spacing strip 34 is provided with concave cylindrical faces 37 and 38 substantially of the same radius of curvature as the cylindrical surfaces of the rollers 12 and 13.

The center body 32 is smaller in thickness than the spacing strip 34, so that the upper and lower faces 39 and 41 of the center body 32 are located at a level below and above the upper and lower faces 40 and 42 of the spacing strip 34, respectively.

The casing which guides the circulation of the rollers 12 and 13 along the annular track surface around the circumference of the race body 10 along with the interposed spacers 31 consists of an upper cover 43 substantially of C-shape in section and a lower cover 44 substantially of W-shape in section. The upper cover 43 is provided with openings 46 and 47, exposing part of rollers 12 and 13 on the load-carrying side of the track surface on the circumference of the race body 10 to support the load by the exposed rollers 12 and 13.

Formed centrally between the openings 46 and 47 of the upper cover 43 is a retainer band 45 having the opposite ends thereof connected to inwardly bulged or embossed guide portions 48 substantially of U-shape in section which are formed at the front and rear ends of the upper cover along the acuate guide walls of the race body 10.

The lower cover 44 is centrally provided with an inwardly embossed guide portion 50 substantially of U-shape in section along the lower side 49 or the non-load-carrying region of the race body 10. Oiling holes 51 and 52 are provided on opposite sides of the guide portion 50 of the lower cover 44.

Indicated at 53 and 54 are notches which are formed into the opposite side walls 55 and 56 of the upper and lower covers 43 and 44, respectively, for fitting engagement with the mounting portions 24 and 25 at opposite sides of the race body 10. The upper and lower covers 43 and 44 are provided with flanges 57 and 58 at the opposite ends thereof and are fixed to each other by rivets 59 which are driven into rivet holes in the flanges 57 and 58. The reference numeral 60 denotes a mechanical structure which incorporates the slide roller bearing of the present invention.

For assembling the slide roller bearing, the lower cover 44 is firstly placed on the lower side or the non-load-carrying side of the race body 10 and then the rollers 12 and 13 and spacers 31 are alternately inserted therebetween. Thereafter, the rollers 12 and 13 and spacers 31 are also alternately placed on the upper or load-carrying side of the race body 10, closing the casing by fitting thereon the upper cover 43 and fixing the flanges 57 and 58 by rivets 59.

In use, the assembled slide roller bearing is mounted in a recess of a mechanical structure by mounting bolts 26 as shown in FIG. 1. With the slide roller bearing thus assembled and set in position, the individual rollers are smoothly rotatable along the track surface of the race body 10 without contacting adjacent rollers due to the insertion of the spacers. The rotating rollers are appropriately advanced from the non-load-carrying to the load-carrying side of the track surface or vice versa by the guidance of the center embossed portions of the upper and lower covers and the arcuately curved walls at the front and rear ends of the race body 10. In the load-carrying region, the rollers are guided along the channels of the precision-machined race body to prevent roller skewing.

Since the spacers are made of a thickness smaller than the diameter of the rollers, they are kept free of contact with the upper and lower covers during circulation and smoothly guide the rollers without skewing. Therefore, it becomes possible to provided a bearing with an extremely reduced rolling resistance and free of abnormal loading or irregularities in accuracy.

In addition, by the employment of the all-round guide system and the center retainer band, the production cost of the bearing can be reduced as compared with the roller retention by the conventional spacers. The upper and lower covers which can be obtained by press-forming permit mass production at low cost. The spacers may be formed by plastics molding or by precision casting of a sintered or die cast alloy to provide a bearing of high performance quality.

Although a preferred embodiment of the invention has been shown in the foregoing description and the accompanying drawings, it is to be understood that the invention includes all alterations and modifications as encompassed by the appended claims.

What is claimed is:

1. In a slide roller bearing, comprising:
   a race body defining an endless track around the circumference thereof;
   a plural number of rollers placed side-by-side along said track of said race body for circulation therearound;
   spacers inserted between individual rollers to prevent contact of adjacent rollers; and
   a casing consisting of upper and lower covers clampingly fixed to each other to guide said rollers from a load-carrying region to a non-load-carrying region of said track or vice versa, said upper cover being provided with openings on opposite sides of a center retainer band, and, inwardly embossed guide portions substantially of U-shape in section in the center portions contiguous to said non-load carrying side of said track, and, said lower cover being provided with an inwardly embossed guide portion substantially of U-shape in the center portion facing said non-load-carrying side of said track.

2. A slide roller bearing as set forth in claim 1, wherein said track on the circumference of said race body is provided with at least two longitudinal channels and a center bank on said load-carrying side and with a flat surface on said non-load-carrying side.

3. A slide roller bearing as set forth in claim 1, wherein each one of said spacers has a center supported body and a pair of spacing strips integrally formed at lateral sides of said center body, which center body having front and rear projections with upright sliding faces perpendicular to the axis of said roller, said spacing strips being smaller than said roller in length and having a thickness smaller than the diameter of said roller, and said spacing strips having on the front and rear sides thereof concave cylindrical faces of a radius of curvature substantially same as that of the circumferential surface of said roller.

* * * * *